May 4, 1926.
E. A. EMERY
1,583,585
MEASURING AND CENTERING DEVICE
Filed April 18, 1924
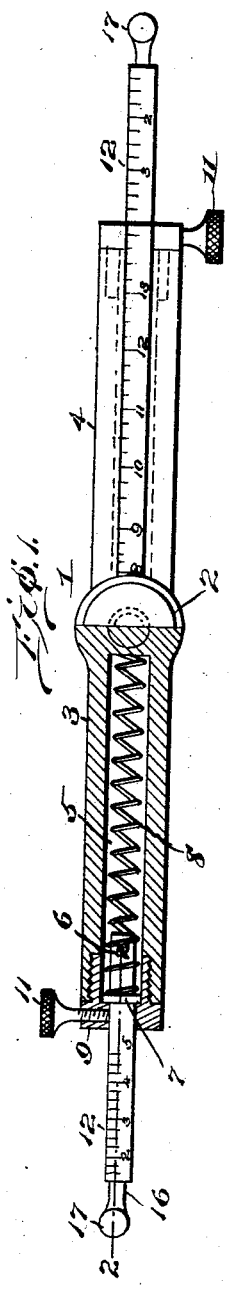
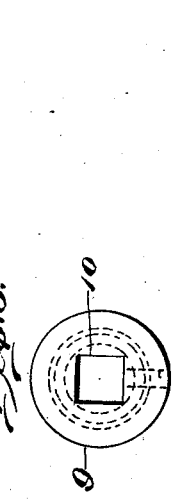
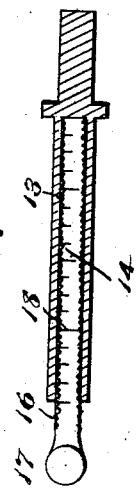
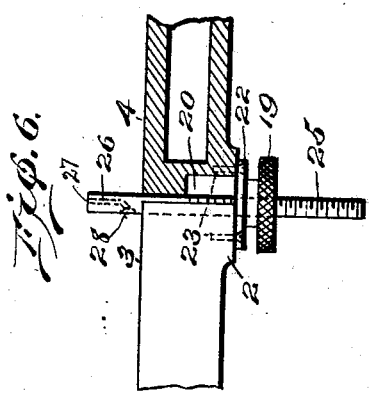
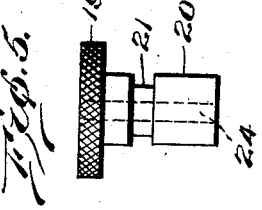
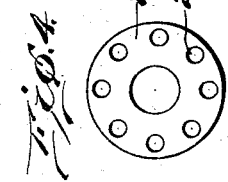
Inventor
Edgar A. Emery
By Robert A. Young
Attorney Patented May 4, 1926.

1,583,585

UNITED STATES PATENT OFFICE.

EDGAR A. EMERY, OF SAN ANTONIO, TEXAS.

MEASURING AND CENTERING DEVICE.

Application filed April 18, 1924. Serial No. 707,383.

*To all whom it may concern:*

Be it known that I, EDGAR A. EMERY, citizen of the United States, residing at San Antonio, in the county of Bexar and State of Texas, have invented certain new and useful Improvements in Measuring and Centering Devices, of which the following is a specification.

This invention relates in general to measuring and centering devices and more particularly to an apparatus for measuring inside diameters of cylinders and the like and determining the centering line of the bore thereof.

In the construction, assembly and repair of locomotives, it is essential to the successful operation of the locomotive that the guides on the cylinder shall be accurately aligned and equidistantly spaced from the center line of the bore of the cylinder. Heretofore a very crude and inefficient method of determining the center line has been employed. It has been the practice to remove the cylinder heads, drive a block of wood into each end of the cylinder, determine the centers of the blocks of wood by the use of calipers, bore a hole at the center thus found, secure to the block a metal plate having an aperture coinciding with that bored into the block, and then stretch a cord or wire through these apertures. This wire is then assumed to represent a true center line of the bore of the cylinder. Obviously such a crude method of determining this line is inefficient, wasteful of material and time and in addition gives inaccurate results.

It is an object of my invention to provide a novel and improved device for measuring inside diameters and one which is capable of several adjustments to permit its use in measuring inside diameters of cylinders of many different sizes. It is a further and most important object of my invention to provide a device by the use of which, either automatically or by ready and simple adjustments, the center line of the bore of cylinders and the like may be easily and quickly determined.

Other objects of my invention will appear in the accompanying specification and claims and will be disclosed in the accompanying drawings, in which—

Figure 1 is a front elevation partly in section of my device.

Figure 2 is a detail in vertical section showing the interior structure of the plunger of Figure 1.

Figure 3 is an end view of the member 9 of Figure 1.

Figure 4 is a detail view of a portion of my device.

Figure 5 is a detail in side elevation of a portion of my device.

Figure 6 is a detail of a portion of the device shown in Figure 5.

Referring with greater particularity to the drawings, it will be seen that my device is comprised as follows:

The main body member 1 of my device has a central cross-bored portion 2 and oppositely extending arms 3 and 4. The arms 3 and 4 with their various component parts are identical in structure and therefore but one will be described in detail. The arm 3 has a central bore 5 extending longitudinally thereof adapted to receive and to allow for the reciprocation of a plunger 6 having a shoulder 7 adapted to have a sliding fit with the interior of the bore 5. A suitable compression spring 8 has one seat in the base of the bore 5 and is adapted to surround the lower end of the plunger 6 and bear against the inner face of the shoulder 7. The outer end of the arm 3 is provided with internal screw threads and is adapted to receive the threaded gland 9 which acts as a retaining means for the plunger 6. The threaded gland 9 has a square cut aperture 10 in which the plunger 6 bears. A set screw 11 extends laterally through the head of the gland 9 and is adapted to bear against the square face of the plunger 6 to hold it in any desired position with relation to the gland. The graduated scale 12 is formed integrally with or secured in any suitable manner to one side of the plunger 6. The plunger 6 is provided with an internal screw threaded bore 13 adapted to receive the threaded shank 14 of a rod 16. The rod 16 terminates in a ball shaped head 17 and is provided along its shank 14 with a suitable graduated scale 18.

A member 20 having an incut portion 21 and knurled grip 19 is adapted to be fitted within the transverse bore 2, to which it is secured by plates 22 and screws 23, the plates 22 fitting the member 20 at its incut portion 21. The member 20 is provided with a longitudinally extending screw threaded bore 24, which is adapted to receive the externally screw threaded sleeve rod 25. This member 25, adjacent to one end thereof is bored as shown at 26, the outlet 27 of the bore 26 being at the center of the end of the member 25 and the outlet 28 terminating in the side thereof.

My device having been described in detail its operation will be seen to be as follows:

When it is desired to measure the inside diameter of any cylinder or the like the plungers 6 are pressed inwardly against the action of their springs 8 and held in this position by means of the set screws 11. When the instrument is placed within the interior of the cylinder, the set screws are loosened, the springs then forcing the plungers 6 outwardly until the balls 17 contact with the cylinder walls, which on account of their spherical shape, automatically seek the greatest position of extension which will be that of the diameter of the circle of the cylinder. This diameter can then be read directly on the graduated scales. When the set screws 11 are released the two plungers 6 will be pressed outwardly to the same degree if the springs 8 are equal in force. If the two scales 12 are pushed outwardly to the same extent, as can be noted from the scales 12, the port 27 will be in exactly the center of the bore of the cylinder. If, however, the springs are of unequal strength and one plunger is pressed outwardly to a slightly greater extent than the other, it is only necessary to press the instrument downwardly against the action of the stronger spring until the two scales show the same reading. The set screw 11 adjacent the plunger actuated by the stronger spring is then tightened against the side of this plunger and the bore 27 thus held in the exact center of the cylinder. The other set screw 11 may then be tightened.

When it is desired to determine the center line of the bore of the cylinder, two of the devices such as I have illustrated, are used, one on each end of the cylinder. The center of each end of the bore of the cylinder is first determined as I have above described and then a wire or cord is inserted through the bore 26 and knotted just outside of the bore 28 in each device. By turning the knurled grips 19 of each instrument, the member 25 can be caused to move inwardly or outwardly of the cylinder by reason of its screw threaded engagement with the member 20 and thus tighten the cord or wire and determine the central line of the bore of the cylinder.

It will be noted that this device may be adjusted to measure larger diameters by adjusting the rods 16 in the bores 13.

I claim:

1. In combination, in a device of the character described, a body portion, oppositely extending spring-pressed plungers carried by said body portion, said body portion having a centrally disposed transverse centering screw threaded bore and a screw threaded rod longitudinally adjustable in said bore.

2. In a device of the character described, in combination, a body portion having oppositely extending arms and a central portion provided with a transverse centering bore, said arms having bores extending longitudinally thereof, spring pressed plungers slidably mounted in said bores, and a rod carried by and longitudinally adjustable in said transverse bore.

3. In a device of the character described, in combination, a body portion having oppositely extending arms and a central portion provided with a transverse centering bore, said arms having bores extending longitudinally thereof, spring-pressed plungers slidably mounted in said bores, a rod carried by and longitudinally adjustable in said transverse bore there being scales on said plunger.

4. In a device of the character described, in combination, a body portion having oppositely extending arms and a central portion provided with a transverse centering bore, said arms having bores extending longitudinally thereof, spring pressed plungers slidably mounted in said bores, a rod carried by and longitudinally adjustable in said transverse bore, said plungers having scales thereon and being adjustable in length.

5. In combination, in a device of the character described, a body portion having oppositely extending arms and a centrally disposed transverse bore, said arms being provided with bores extending longitudinally thereof, oppositely extending spring pressed plungers mounted in said longitudinal bores in said body portion and adapted to center said transverse centering bore in the cylinder in connection with which the device is to be used and means for fixing said plungers in any position to which they are adjusted.

In testimony whereof I affix my signature.

EDGAR A. EMERY.